Figure 1:
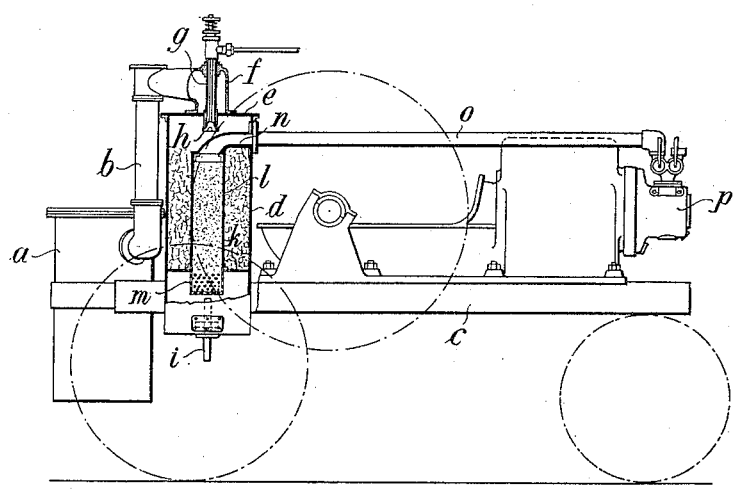

F. BALASSA.
GAS WASHING, COOLING, AND DRYING APPARATUS.
APPLICATION FILED DEC. 27, 1913.

1,205,964.

Patented Nov. 28, 1916.

UNITED STATES PATENT OFFICE.

FREDERICK BALASSA, OF BUDAPEST, AUSTRIA-HUNGARY, ASSIGNOR TO HUNGARIAN BANKING AND TRADING COMPANY, LIMITED, OF BUDAPEST, AUSTRIA-HUNGARY.

GAS WASHING, COOLING, AND DRYING APPARATUS.

1,205,964.

Specification of Letters Patent.

Patented Nov. 28, 1916.

Application filed December 27, 1913. Serial No. 809,130.

*To all whom it may concern:*

Be it known that I, FREDERICK BALASSA, engineer, and resident of Budapest, in the Empire of Austria-Hungary, have invented certain new and useful Improvements in Gas Washing, Cooling, and Drying Apparatus, of which the following is a specification.

This invention relates to an apparatus for washing, cooling and drying the gases of suction-gas locomotives, and differs from the existing arrangements of this kind in that the object is to produce an apparatus which, while requiring little space and being suitably designed for fitting up in a traveling frame-work, as is of particular importance for locomotives, possesses a specially good cooling and drying action, and requires only the least possible work of suction by the engine, so that the brake horse-power is increased.

In particular, the apparatus is of the kind in which the producer placed in front on the locomotive is separated from the washing, drying and cooling arrangement and the gases generated in the producer escape from the top and enter the washing, cooling and drying arrangement through a conical passage on top.

As distinguished from the suitable forms of construction of such an apparatus which already exist in which the separate units are arranged horizontally underneath the engine frame one behind another, the present apparatus is characterized by the fact that the producer gas entering from above through the conical passages, is conducted vertically downward and concentrically around the cooling water entry pipe, which is provided in the upper part of the vertical container of the apparatus with a rose-like sprinkler, which sprays out the cooling water immediately beneath the cover of the outer container in a plane perpendicular to the direction of flow of the gases, so that all the gas must pass through the fine streams of cooling water thus formed. By this means an extraordinarily effective and intimate mixture of the gases with the cooling water, and consequently a very effective cooling, takes place.

A further characteristic is that the drying apparatus is built concentrically inside this container, and its casing is held in this position by means of a supporting sieve or screen, beneath which the casing itself is provided with small openings. The space between the two vessels above the supporting sieve is filled with suitable cleaning material such as coke for example, and forms at the same time a further washing and cooling arrangement, since the water for cooling and washing which is sprayed from the rose above, flows downward together with the gases in a uniform stream, and owing to its distribution over the filling material, a large surface of contact is formed, like a kind of cooling tower. The water collects at the bottom and flows out through a central overflow pipe, so that the warm water continually runs off and is replaced by freshly sprinkled cold water. The gas thus cleaned and already much cooled then enters the concentric drying vessel from below through its sieve-like bottom portion and flows upward through it, in the opposite direction to the flow of gas in the washing chamber, which is downward. This drying vessel is also charged with suitable material, loose iron filings for example. The gas which is already considerably cooled, completely washed and well dried then passes out from the top of the apparatus through an elbow pipe and is brought through a long, straight, horizontal pipe to the engine cylinder, which is placed at the back of the whole locomotive. By means of this particular arrangement an important advantage, as is confirmed also by brake tests, is secured, namely that, owing to the absolutely complete cooling and drying of the gas the power of the engine is increased, while losses due to throttling, which the existing arrangements give rise to on account of the many changes of direction and walls of separation, are here obviated.

A further important advantage is that, the engine can be started much more quickly and the compressor or other starting mechanism, which is otherwise necessary in order to change over from starting to normal working, may be omitted. It is only necessary to start the engine with petrol or like spirit, in order to enable it, after a few moments to suck the desired mixture of gas through the combined and concentric washing, cooling and drying apparatus.

Yet another considerable advantage, especially for a locomotive of this kind is the extraordinarily advantageous construction of the relatively small washing, cooling and drying apparatus and the possibility of cleaning them easily and thoroughly. The apparatus can be at once fixed between the two channel girders which form the frame of the machine and fastened to them, and for cleansing it is sufficient to unscrew the conical angular passage together with its sprinkler, in order for the interior of the apparatus to become readily accessible from above.

Figure 2:
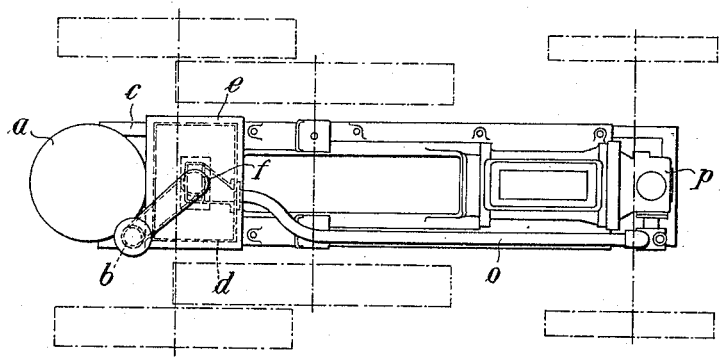

In the drawing Figure 1 is a side elevation of a suction gas locomotive with the apparatus fitted to it in section, Fig. 2 is a plan view of the same.

$a$ is the producer, which is in a known manner suspended in the front of the frame and separated from the washing apparatus. The gases produced leave $a$ from above through the pipe $b$. Between the U-girders $c$ of the frame the prismatic container $d$ of the washing, cooling and drying apparatus is built in from above, its cover $e$ carrying the concentrically placed conical angular passage $f$. In this is fitted, also concentrically, the cooling water pipe $g$ which has an adjustable spraying cone $h$ fitted in the orifice. In the lower portion are arranged an overflow pipe $i$ and an intermediate sieve-like bottom with openings $k$, which serves to hold the inner drying chamber $l$ in its concentric position. The lower portion of this chamber $l$ is itself of sievelike form. The top of the vessel $l$ is fastened by means of an elbow pipe $n$ to the inner side of the wall of the outer container $d$, and connected with a long conducting pipe $o$ which leads to the cylinder head $p$ of the engine. The space between the walls $l$ and $d$ is filled with suitable filtering material, as is also the interior of the vessel $l$.

I claim:

In a gas washing, cooling and drying apparatus, the combination of a vertical outer container adapted to be supplied with coke, with a concentric inner container provided with perforations in its lower part within said outer container and adapted to receive a supply of iron filings, a gas outlet pipe connecting the top of said inner container, a gas inlet pipe carried by the cover of the outer container, a water inlet pipe extending concentrically through said gas inlet pipe into the outer container, a sprinkler carried by said water inlet pipe beneath the outlet of said gas pipe but above the means for connecting the top of said inner container with the gas outlet pipe, said sprinkler spraying the cooling water immediately underneath the cover of the outer container in close proximity to said connecting means and in a plane perpendicularly to the direction of flow of the gases, substantially as described and for the purpose set forth.

In testimony whereof I affix my signature in presence of two witnesses.

FREDERICK BALASSA.

Witnesses:
  TÖRÖK TÁSCLO,
  JOHN J. RONTO.

Copies of this patent may be obtained for five cents each, by addressing the "Commissioner of Patents, Washington, D. C."